United States Patent
Kippax et al.

[15] 3,679,766
[45] July 25, 1972

[54] CRYSTALLIZATION OF 2,6-DIPHENYLPHENOL

[72] Inventors: Donald L. Kippax, West Stockbridge; Kevin E. Murphy, Pittsfield, both of Mass.

[73] Assignee: General Electric Company

[22] Filed: Dec. 22, 1966

[21] Appl. No.: 603,976

[52] U.S. Cl. .................... 260/620, 260/346.2 M, 260/586 R, 260/619 R, 260/619 D
[51] Int. Cl. ........................................ C07c 37/22
[58] Field of Search ..................... 260/620, 619 D

[56] References Cited

UNITED STATES PATENTS 2,129,908  9/1938  Britton ................................ 260/620

OTHER PUBLICATIONS

Plesek, Collection Czech. Chem. Communications Vol. 21, pp. 375–81, 1956. [ QD1C69]

*Primary Examiner*—Leon Zitver
*Assistant Examiner*—Norman Morgenstern
*Attorney*—William F. Mafatti, Morgan, Finnegan, Durham & Pine, Frank L. Neuhauser, Joseph B. Forman and Oscar B. Waddell

[57] ABSTRACT

A process for the separation of high purity 2,6-diphenylphenol from a mixture of 2,6-disubstituted phenols by fractional crystallization. The process is characterized by at least one crystallization stage from a solvent system comprising a mixture of an aliphatic solvent and an aromatic solvent. By the process of the invention, 2,6-diphenylphenol having a purity of at least 99.8% can be separated from a mixture of phenols using only two crystallization stages.

4 Claims, 1 Drawing Figure

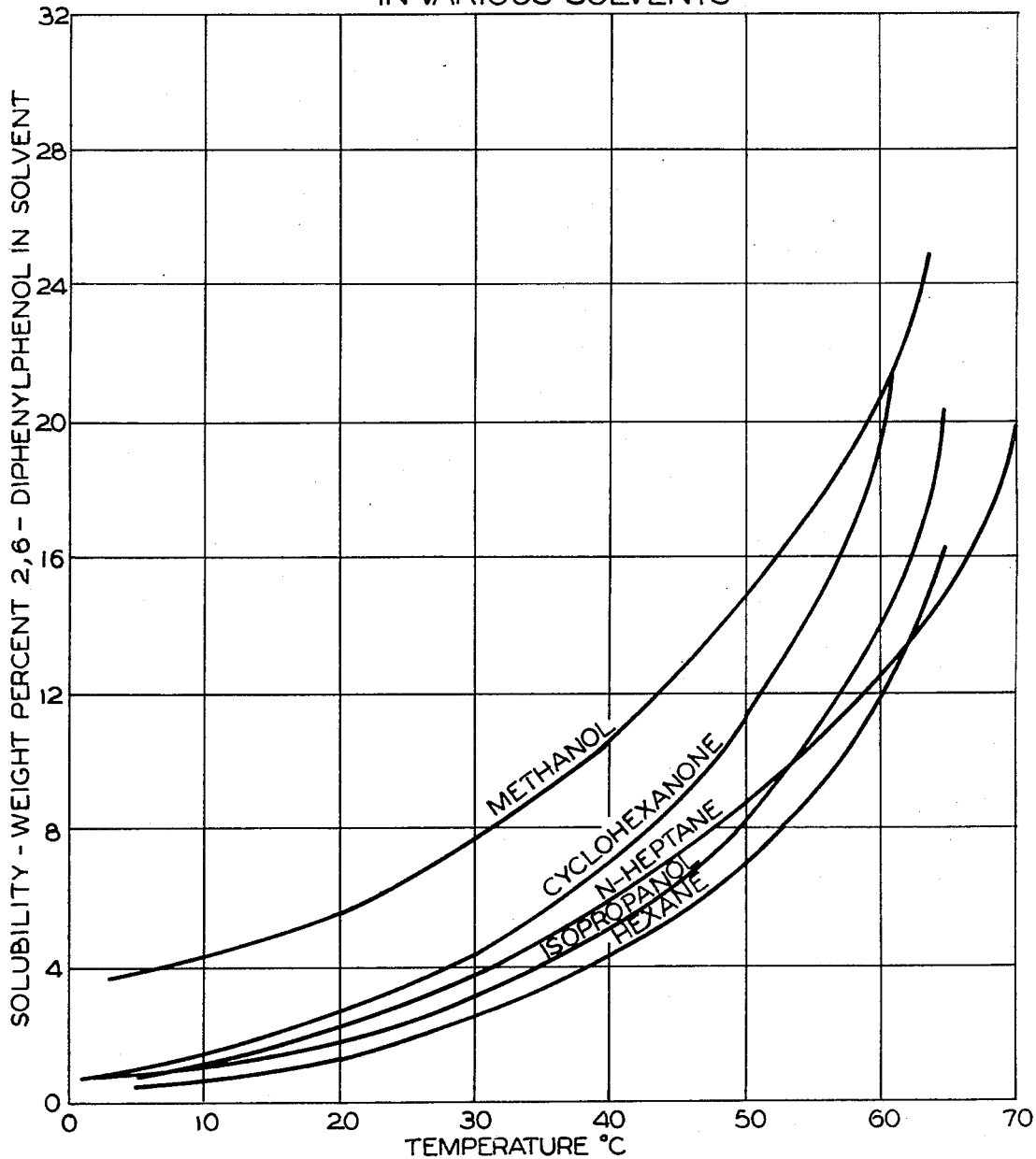

CRYSTALLIZATION OF 2,6-DIPHENYLPHENOL

This invention relates to the separation of 2,6-diphenylphenol from a mixture composed of mixed 2,6-disubstituted phenols. In one of its more specific embodiments, this invention is directed to the separation of 2,6-diphenylphenol from a mixture containing the reaction products obtained from the dehydrogenation of tricyclic ketones.

2,6-Diphenylphenol is an important material in the manufacture of dyes, drugs, plastics, insulating materials, insecticides and the like. Insofar as it is known, the first economical process for the manufacture of this material is disclosed in U.S. application Ser. No. 601,771 the contents of which are incorporated herein by reference. In accordance with the disclosed process, cyclohexanone is used as a starting material and is subjected to a modified base catalyzed aldol autocondensation reaction to form a mixture of tricyclic ketones, water, partially condensed bicyclic ketones and high boiling impurities. The tricyclic ketones comprise a mixture of 2,6-dicyclohexenylcyclohexanone, 2,6-dicyclohexylidenecyclohexanone, and 2-cyclohexenyl-6-cyclohexylidenecyclohexanone, the mixture hereinafter referred to as "tricyclic ketones" for brevity. They are separated from the reaction mixture and dehydrogenated to form 2,6-diphenylphenol.

The conversion of the tricyclic ketones to the 2,6-diphenylphenol appears to occur through a sequence of steps, each reaction product in the sequence differing from those alongside it with respect to its state of reduction. It is believed that the tricyclic ketones are reduced to 2,6-diphenylphenol in the following manner:

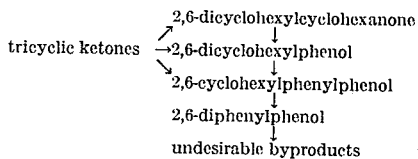

From a process standpoint, it is very difficult to regulate the dehydrogenation reaction conditions to obtain a product consisting essentially of 2,6-diphenylphenol. In practice, maximum yields of up to 70%, by weight, of the desired phenol can be recovered with the remainder of the product containing the above noted dehydrogenation materials as well as minor quantities of high and low boiling by-products. Therefore, the problem involves the separation and recovery of 2,6-diphenylphenol from a mixture containing 2,6-diphenylphenol, 2-cyclohexyl-6-phenylphenol, 2,6-dicyclohexylphenol, 2,6-dicyclohexylcyclohexanone and up to about 15% by-products such as m-terphenyl, phenyldibenzofuran, triphenylene, etc. For brevity, the mixture of components resulting from the dehydrogenation reaction will be referred to as the "dehydrogenation product" throughout the remainder of this disclosure.

The major components of the dehydrogenation product have similar boiling and freezing points and are present in a typical mixture in quantities as represented below:

| Compound | Boiling Point °C. | Freezing Point °C. | Composition Wt. % Maximum | Composition Wt. % Minimum |
|---|---|---|---|---|
| 2,6-diphenylphenol | 325 | 101 | 70 | 25 |
| 2-cyclohexyl-6-phenylphenol | 314 | 58 | 60 | 5 |
| 2,6-dicyclohexylphenol | 315 | 76 | 40 | 0 |
| 2,6-dicyclohexylcyclohexanone | 309 | 130 | 25 | 0 |

From the data, it can be seen that separation by distillation of the 2,6-diphenylphenol would be very difficult and the column used would require a large number of trays. In addition, it would be necessary to design the column to withstand high temperatures or partial vacuum, thereby increasing the overall cost of a distillation operation. On the other hand, from the freezing point data, crystallization does appear to be a facile means for separating the 2,6-diphenylphenol from the dehydrogenation products. It has been found in practice, however, that the components in the dehydrogenation product fail to precipitate at their freezing points and crystals of 2,6-diphenylphenol do not appear until a temperature of from 30° to 40° C. is reached. At this low temperature, the entire mixture is a viscous, syrupy liquid containing small crystallites. It has been found extremely difficult, and from a process standpoint, highly impractical, to separate the 2,6-diphenylphenol crystallites from this liquid.

A method has now been found whereby substantially pure 2,6-diphenylphenol can be separated by fractional crystallization from other 2,6-disubstituted phenols. Therefore, the process of this invention is broadly applicable to the separation of 2,6-diphenylphenol from a mixture containing 2,6-diphenylphenol and at least one different phenol corresponding to the formula:

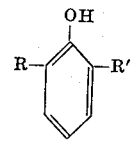

wherein R and R' are each members selected from the group consisting of six membered cycloaliphatic and aromatic radicals. A more specific embodiment of this invention is directed to the separation of 2,6-diphenylphenol from the dehydrogenation products resulting from the dehydrogenation of tricyclic ketones in accordance with the process disclosed in the above noted co-pending patent application.

In a preferred embodiment of this invention, it has been unexpectedly found that 2,6-diphenylphenol having a purity of at least 98.0% can be recovered from a mixture containing as much as 70% impurities using a single crystallization stage and at least 99.8% purity with as few as two crystallization stages. This is unexpected because a plurality of crystallization stages are normally required to obtain a product having a comparable purity following prior art procedures, especially from a mixture containing as high a level of impurity.

Accordingly, an object of this invention is to provide a crystallization procedure for separating pure 2,6-diphenylphenol from a mixture of phenols.

Another object of this invention is to provide a crystallization procedure for separating highly pure 2,6-diphenylphenol from a mixture that is the product of the dehydrogenation of a mixture of tricyclic ketones.

Still another object of this invention is to provide a crystallization procedure for the recovery of 2,6-diphenylphenol having a purity of at least 98.0% from a mixture containing as much as 70% impurities using a single crystallization stage and having a purity of at least 99.8% using two crystallization stages.

Other objects and advantages will be in part apparent and in part pointed out in the description which follows.

As discussed above, the components in the dehydrogenation mixture do not crystallize at their freezing points, but at substantially lower temperatures. It has been found that 2,6-diphenylphenol crystallizes first as the temperature of the mixture is lowered. This is surprising because other components in the mixture, such as 2,6-dicyclohexylcyclohexanone, have higher freezing points than 2,6-diphenylphenol. It is believed that the reason for this behavior is due in part to the mutual solubility of the components comprising the mixture with 2,6-diphenylphenol being the least soluble component. These solubility characteristics permit dilution of the mixture with an appropriate solvent followed by cooling to crystallize 2,6-diphenylphenol, the remaining components being held in solution by the action of the solvent and their mutual solubility for each other.

Briefly stated, the process of the invention comprises the steps of:

1. forming a solution by dissolving in a solvent, a mixture containing 2,6-diphenylphenol and at least one different phenol corresponding to the formula

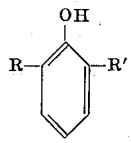

wherein R and R' are each members selected from the group consisting of six membered cycloaliphatic and aromatic radicals;

2. lowering the temperature of the solution to a point where the 2,6-diphenylphenol preferentially crystallizes; and 3. recovering the 2,6-diphenylphenol crystals from solution.

The preferred solvent is one wherein the solubility of 2,6-diphenylphenol is largely dependent upon temperature. In other words, 2,6-diphenylphenol should be infinitely soluble in the solvent at elevated temperatures, and only slightly soluble or non-soluble at lower temperatures. In general, it has been found that aliphatic and cycloaliphatic solvents are suitable for purposes of the present invention while 2,6-diphenylphenol cannot be recovered in good yields by fractional crystallization using aromatic solvents. Typical solvents that may be used include, for example, aliphatic, including cycloaliphatic hydrocarbons having a minimum of six carbon atoms, such as, for example, hexane, cyclohexane, octane, nonane, decane, dodecane, tetradecane, etc.; alcohols, such as, for example, methanol, ethanol, propanol, butanol, glycol, etc.; ethers, such as, for example, dimethyl ether, ethylmethyl ether, ethyl ether, propylmethyl ether, methylal, etc.; ketones, such as, for example, acetone, ethylmethyl ketone, propylmethyl ketone, etc.

Solubility curves for 2,6-diphenylphenol in preferred solvents are shown in the drawing. The solvents depicted are preferred because the solubility of 2,6-diphenylphenol is largely dependent upon temperature and the temperature range between infinite solubility and limited solubility is narrow. In addition, the temperature range is practical because solutions can be prepared at temperatures below 100° C. and 2,6-diphenylphenol can be recovered by lowering the temperature of the solution to approximately room temperature.

The quantity of solvent used is, of course, dependent upon the solubility of the mixed phenols or dehydrogenation products in the solvent. In general, it is preferred to use a solvent that is required in an amount ranging between 50 and 500% by weight of the solute. In other words, the weight ratio of solvent to solute should range between 0.5:1.0 and 5.0:1.0.

In a preferred embodiment of this invention, a mixed aliphatic-aromatic solvent is utilized for the crystallization operation. The aliphatic component in the solvent mixture may vary from 75 to 99% by weight and the aromatic constituent between 25 to 1% by weight of the total solvent composition. The aromatic component should be one that has freezing and boiling points similar to those of the aliphatic solvent. Benzene, toluene and the xylenes are typical examples of suitable solvents. A preferred solvent mixture is 85 to 90% isopropanol and 10 to 15% toluene. It has been found that when a mixed solvent of this nature is used, highly pure 2,6-diphenylphenol may be recovered. For example, using the preferred isopropanol-toluene mixture with a mixed phenol containing only 50% 2,6-diphenylphenol, it is possible to recover 2,6-diphenylphenol having a purity in excess of 98.0% using one crystallization stage and 99.8% using only two crystallization stages.

Crystals of 2,6-diphenylphenol recovered using the crystallization technique of the present invention are long, thin and hexagonal in shape. They are typically 200 by 40 microns when recovered from an isopropanol-toluene solvent system and frequently vary between 80 by 10 microns to 1,300 by 180 microns for other solvent systems.

The following examples are set forth for purposes of illustration only and should not be construed as limiting the invention in any way. All percentages expressed in the examples are by weight unless otherwise indicated. For convenience, the following abbreviations have been adopted to identify specific components used in the examples.

| | |
|---|---|
| DPP | 2,6-diphenylphenol |
| DCP | 2,6-dicyclohexylphenol |
| CPP | 2-cyclohexyl-6-phenylphenol |
| MT | m-terphenyl |
| TP | triphenylene |
| ST | 2,6-dicyclohexylcyclohexanone |
| DCC | 2,6-dicyclohexenylcyclohexanone |
| PDBF | phenyldibenzofuran |
| U | unknowns |

EXAMPLE 1

A stainless steel vessel was equipped with an external heat exchange coil, a thermometer and an agitator. A dehydrogenation product, recovered from the dehydrogenation of 2,6-dicyclohexylcyclohexanone, and isopropyl alcohol were charged to the vessel in a ratio of two parts by weight solvent to one part dehydrogenation product. The agitator was turned on and rotated at a speed of approximately 850 RPM. The vessel was heated to approximately 55° C. All of the dehydrogenation product dissolved in the solvent. The temperature of the solution was then slowly decreased to a final temperature range varying between 10° and 22° C. Crystals began to appear at a temperature of approximately 35° C. After the temperature had been maintained for a period of time, the crystals were recovered by filtration and washed with cold isopropyl alcohol. Thereafter, the crystals were redissolved in isopropyl alcohol and recrystallized using the same procedures above described. The procedure was then repeated a third time. The initial composition of the feed and a product analysis for each of the three crystallization stages are set forth in Table 1 below.

TABLE 1

| Component | Initial | Composition (Wt. %) | | |
|---|---|---|---|---|
| | | 1st. Crystallization | 2nd. Crystallization | 3rd. Crystallization |
| DPP | 46.0 | 95.6 | 99.0 | 99.4 |
| DCP | 10.5 | 1.7 | 0.5 | 0.3 |
| CPP | 29.2 | 1.2 | 0.4 | 0.2 |
| MT | 2.7 | 0.1 | — | — |
| TP | trace | — | — | — |
| ST | 3.8 | 0.7 | 0.1 | 0.1 |
| DCC | 0.6 | — | — | — |
| PDBF | 4.5 | 0.5 | — | — |
| U | 4.7 | 0.2 | — | — |

EXAMPLE 2

The procedure of Example 1 was repeated, but a cyclohexane solvent was substituted for isopropyl alcohol, and the third crystallization stage was eliminated.

The ratio of solvent to dehydrogenation products was 3 to 1. The composition of the dehydrogenation product and the analysis of the product after each crystallization stage is set forth in Table 2.

TABLE 2

| Component | Initial | Composition (Wt. %) | |
|---|---|---|---|
| | | 1st. Crystallization | 2nd. Crystallization |
| DPP | 51.0 | 93.6 | 99.0 |
| DCP | 8.7 | 2.1 | 0.3 |
| CPP | 22.9 | 3.7 | 0.6 |
| MT | — | — | — |
| TP | 0.8 | 0.2 | — |
| ST | 5.2 | — | — |
| DCC | — | — | — |
| PDBF | 6.0 | — | — |
| U | 3.4 | 0.4 | 0.1 |

EXAMPLES 3-5

Using the dehydrogenation products and procedures of Example 1, three additional two stage crystallizations were performed. Hexane, methanol and heptane were used as solvents for each crystallization operation respectively. The crystals resulting from each stage of crystallization were analyzed. The results are set forth in Table 3 below.

TABLE 3

| Solvent | Wt. % 2,6-diphenylphenol | |
|---|---|---|
| | 1st. crystallization | 2nd. crystallization |
| hexane | 96.7 | 98.9 |
| methanol | 98.3 | 99.4 |
| heptane | 97.5 | 99.9 |

EXAMPLE 6

The procedure of Example 1 was repeated but a mixed solvent containing 9 parts isopropanol and 1 part toluene was used for the first crystallization stage and isopropanol alone was used for the second crystallization stage. A third stage was not used. The following results were obtained.

TABLE 4

| Component | Initial | Composition (Wt. %) | |
|---|---|---|---|
| | | 1st. Crystallization | 2nd. Crystallization |
| DPP | 55.0 | 99.4 | 99.9 |
| DCP | 6.5 | 0.1 | — |
| CPP | 21.4 | 0.4 | 0.1 |
| MT | 2.8 | 0.1 | — |
| TP | 1.1 | — | — |
| ST | 1.2 | — | — |
| DCC | — | — | — |
| PDBF | 1.1 | — | — |
| U | 0.9 | — | — |

From the above data, it can be seen that the presence of a small quantity of an aromatic solvent greatly increases the efficiency of the crystallization procedure and with only two crystallization stages, 2,6-diphenylphenol can be recovered having a purity of 99.9%.

EXAMPLE 7

The procedure of Example 6 was repeated, but the mixed isopropanol-toluene solvent was used for both crystallization stages. A product having a purity in excess of 99.9% was recovered from the second crystallization stage.

EXAMPLE 8

The procedure of Example 7 was repeated 20 times to determine the reproducibility of the process. It was found that the purity of 2,6-diphenylphenol approximated 99.9% after the second recrystallization in sixteen of the twenty runs and approximated 99.7% in the remaining four runs.

EXAMPLE 9

The procedure of Example 1 was repeated but a solvent consisting of 9 parts heptane and 1 part benzene was used. Two crystallization stages were used. The ratio of solvent to dehydrogenation products was 2.5 to 1. The following results were obtained.

TABLE 5

| Component | Initial | Composition Wt. % | |
|---|---|---|---|
| | | 1st. Crystallization | 2nd. Crystallization |
| DPP | 68.7 | 99.6 | 99.9+ |
| DCP | 3.6 | — | — |
| CPP | 16.4 | 0.3 | 0.1 |
| MT | 1.3 | — | — |
| TP | 2.2 | — | — |
| ST | 1.8 | — | — |
| DCC | 5.7 | 0.1 | — |
| PDBF | 0.3 | — | — |
| U | 0.6 | — | — |

EXAMPLE 10

The procedure of Example 1 was repeated. An attempt was made to separate 2,6-diphenylphenol from a mixture containing 50% 2,6-diphenylphenol and 50% 2-cyclohexyl-6-phenylphenol. Isopropanol was used as the solvent in a ratio of 3 parts solvent to 1 part solute. The 2,6-diphenylphenol recovered from the first crystallization stage possessed a purity of 99.4% and the product of the second stage had a purity in excess of 99.9%.

The crystallization process of this invention is not limited to batch procedures as illustrated in the above examples, but is readily converted to a continuous operation. In addition, it should be understood that other changes may be made in the particular embodiments of the invention described which are within the full intent and scope of the invention as defined by the appended claims.

What we claim as new and desire to secure by Letters Patent of the United States is:

1. In a process for recovering a 2,6-diphenylphenol from a mixture of phenols where each phenol in the mixture corresponds to the formula:

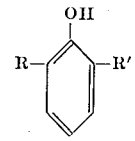

and R and R' are each members selected from the group of aryl radicals and six membered cycloaliphatic radicals, said process comprising the steps of dissolving the mixture of phenols in a first solvent, lowering the temperature of the so formed solution to below the freezing point of 2,6-diphenylphenol, recovering 2,6-diphenylphenol from solution, dissolving the recovered 2,6-diphenylphenol in a second solvent, lowering the temperature of the so formed solution to below the freezing point of 2,6-diphenylphenol and recovering 2,6-diphenylphenol from solution; the improvement wherein one of said first and second solvents is a mixture of an aliphatic solvent selected from the group consisting of isopropanol, methanol and cyclohexanone and an aromatic solvent selected from the group consisting of benzene, toluene and a xylene and the other of said first and second solvents is selected from the group consisting of isopropanol, methanol and cyclohexanone and mixtures thereof with a member selected from the group of benzene, toluene and a xylene.

2. The process of claim 1 where the second solvent is a mixture of isopropanol and toluene.

3. In a process for separating 2,6-diphenylphenol from a mixture of phenols where each phenol in the mixture corresponds to the formula:

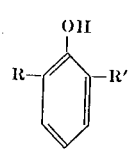

and R and R' are each members selected from the group consisting of arylradicals and six membered cycloaliphatic radicals, said process comprising the steps of dissolving the mixture of phenols in a solvent and lowering the temperature of the solution to below the freezing point of 2,6-diphenylphenol; the improvement comprising the use of a solvent system consisting essentially of from 75 to 99% by weight of an aliphatic solvent selected from the group consisting of isopropanol, methanol and cyclohexanone and from 1 to 25% by weight of an aromatic solvent selected from the group consisting of benzene, toluene and a xylene.

4. In a process for separating 2,6-diphenylphenol from a mixture of phenols where each phenol in the mixture corresponds to the formula:

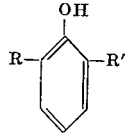

and R and R' are each members selected from the group consisting of arylradicals and six membered cycloaliphatic radicals, and the process comprises the steps of dissolving the mixture of phenols in a solvent and lowering the temperature of the solution to below the freezing point of 2,6-diphenylphenol; the improvement comprising the use of a solvent system consisting essentially of from 75 to 99% by weight isopropanol and from 1 to 25% by weight toluene.

* * * * *